United States Patent
Chmura et al.

(10) Patent No.: US 7,113,847 B2
(45) Date of Patent: *Sep. 26, 2006

(54) ROBOTIC VACUUM WITH REMOVABLE PORTABLE VACUUM AND SEMI-AUTOMATED ENVIRONMENT MAPPING

(75) Inventors: Bryan Chmura, Parma, OH (US);
Robert N. McKee, Aurora, OH (US);
Victor Younger, Parma, OH (US);
Mark E. Reindle, Parma, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 357 days.

This patent is subject to a terminal disclaimer.

(21) Appl. No.: 10/423,588

(22) Filed: Apr. 25, 2003

(65) Prior Publication Data

US 2003/0229421 A1  Dec. 11, 2003

Related U.S. Application Data

(60) Provisional application No. 60/378,478, filed on May 7, 2002.

(51) Int. Cl.
*G06F 19/00* (2006.01)

(52) U.S. Cl. ............... 700/245; 700/246; 700/259; 700/248; 700/249; 700/250; 701/300; 701/301; 318/568.1

(58) Field of Classification Search ............... 700/259, 700/245, 246, 249, 250, 256, 264; 701/1, 701/23–26, 300–301; 901/1, 46–47; 318/580–581, 318/58, 568.1, 568; 15/319
See application file for complete search history.

(56) References Cited

U.S. PATENT DOCUMENTS

| 4,967,862 | A |   | 11/1990 | Pong et al. |
|-----------|---|---|---------|-------------|
| 5,355,064 | A | * | 10/1994 | Yoshino et al. ........ 318/568.12 |
| 5,440,216 | A |   | 8/1995 | Kim |

(Continued)

FOREIGN PATENT DOCUMENTS

DE  43 23 332 A1  1/1995

(Continued)

OTHER PUBLICATIONS

I. Ulrich, F. Mondada, J.D. Nicoud, "Autonomous vacuum cleaner", *Robotics and Autonomous Systems*, vol. 19, No. 3-4, Mar. 1997, pp. 233-245, Elesevier Science Publishers, Amsterdam, NL.

*Primary Examiner*—Thomas G. Black
*Assistant Examiner*—McDieunel Marc
(74) *Attorney, Agent, or Firm*—Fay, Sharpe, Fagan, Minnich & McKee, LLP

(57) ABSTRACT

A robotic vacuum cleaner (10) with a self-propelled controller (12) with a vacuum source (36, 38) and a dirt receptacle (32), a self-propelled cleaning head (14) with a suction inlet (24), and an interconnecting hose (16) is provided. The controller and cleaning head cooperatively traverse a surface area in tandem when the interconnecting hose is connected between the cleaning head and the controller. In one embodiment, the controller includes a power source (56) making the robotic vacuum autonomous. In another embodiment, the controller includes a power cord dispense/retract assembly (168) to provide access to utility power. In another aspect, the controller includes a portable vacuum (20) that is removed for manual operations. In still another aspect, a method of semi-automated environment mapping for a self-propelled robotic vacuum is provided. With respect to the method, the robotic vacuum also includes a remote control (18).

57 Claims, 10 Drawing Sheets

U.S. PATENT DOCUMENTS

| | | |
|---|---|---|
| 5,534,762 A | 7/1996 | Kim |
| 5,709,007 A | 1/1998 | Chiang |
| 5,720,077 A | 2/1998 | Nakamura et al. |
| 5,841,259 A | 11/1998 | Kim et al. |
| 5,936,367 A * | 8/1999 | Takenaka ............... 318/568.12 |
| 5,940,930 A | 8/1999 | Oh et al. |
| 6,064,167 A * | 5/2000 | Takenaka et al. ...... 318/568.12 |
| 6,226,830 B1 | 5/2001 | Hendriks et al. |
| 6,301,524 B1 * | 10/2001 | Takenaka .................... 700/245 |
| 6,370,453 B1 | 4/2002 | Sommer |
| 6,463,368 B1 | 10/2002 | Feiten et al. |
| 6,581,239 B1 | 6/2003 | Dyson et al. |
| 2002/0174506 A1 | 11/2002 | Wallach et al. |
| 2005/0055792 A1 * | 3/2005 | Kisela et al. ................. 15/319 |
| 2005/0065662 A1 * | 3/2005 | Reindle et al. ................ 701/1 |

FOREIGN PATENT DOCUMENTS

| | | |
|---|---|---|
| WO | WO 98/00239 A | 1/1998 |
| WO | WO 02/074150 | 9/2002 |

* cited by examiner

ROBOTIC VACUUM WITH REMOVABLE PORTABLE VACUUM AND SEMI-AUTOMATED ENVIRONMENT MAPPING This application claims the benefit of U.S. Provisional Patent Application Ser. No. 60/378,478, filed on May 7, 2002, the disclosure of which is incorporated herein by reference.

BACKGROUND OF INVENTION

The invention relates to a robotic vacuum. It finds particular application in conjunction with a robotic vacuum having a controller with a removable portable vacuum, a cleaning head, and an interconnecting hose assembly and will be described with particular reference thereto. In one embodiment, the robotic vacuum cleaner has an internal power source and is autonomously self-propelled. In another embodiment, the robotic vacuum cleaner is also self-propelled, but uses standard utility power. In still another embodiment, the robotic vacuum cleaner includes a remote control and provides semi-automated environment mapping. However, it is to be appreciated that the invention is also amenable to other applications.

It is well known that robots and robot technology can automate routine household tasks eliminating the need for humans to perform these repetitive and time-consuming tasks. Currently, technology and innovation are both limiting factors in the capability of household cleaning robots. Computer processing power, battery life, electronic sensors such as cameras, and efficient electric motors are all either just becoming available, cost effective, or reliable enough to use in autonomous consumer robots.

Much of the work on robotic vacuum technology has centered on navigation and obstacle detection and avoidance. The path of a robot determines its success at cleaning an entire floor and dictates whether or not it will get stuck. Some proposed systems have two sets of orthogonal drive wheels to enable the robot to move directly between any two points to increase its maneuverability. Robotic vacuum cleaners have mounted the suction mechanics on a pivoting or transverse sliding arm so as to increase the reach of the robot. Many robotic vacuums include methods for detecting and avoiding obstacles.

Generally, there are two standard types of vacuums: upright and canister. Uprights tend to be more popular because they are smaller, easier to manipulate and less expensive to manufacture. Conversely, the principle advantage of canister vacuums is that, while the canister may be more cumbersome, the cleaning head is smaller. A few patents and published patent applications have disclosed self-propelled and autonomous canister-like vacuum cleaners.

For example, U.S. Pat. No. 6,226,830 to Hendriks et al. and assigned to Philips Electronics discloses a canister-type vacuum cleaner with a self-propelled canister. The vacuum cleaner also includes a conventional cleaning head and a hose assembly connecting the cleaning head to the canister. The canister includes an electric motor, a caster wheel, two drive wheels, a controller, and at least one touch or proximity sensor. The controller controls at least the direction of at least one of the drive wheels. As a user operates the vacuum cleaner and controls the cleaning head, the sensors in the canister detect obstacles and the controller controls the canister to avoid the obstacles.

U.S. Pat. No. 6,370,453 to Sommer discloses an autonomous service robot for automatic suction of dust from floor surfaces. The robot is controlled so as to explore the adjacent area and to detect potential obstacles using special sensors before storing them in a data field. The displacement towards a new location is then carried out using the stored data until the whole accessible surface has been covered. One of the main constituent members of the robot includes an extensible arm that rests on the robot and on which contact and range sensors are arranged. When the robot is used as an automatic vacuum cleaner, airflow is forced into the robot arm. When one or more circular rotary brushes are provided at the front end of the arm, the cleaning effect is enhanced.

U.S. Pat. No. 6,463,368 to Feiten et al. discloses a self-propelled vacuum cleaner. The vacuum cleaner includes a pivotable arm and a cable to connect to an electrical receptacle for power. The arm includes a plurality of tactile sensors to recognize obstacles by touching the obstacle with the arm. The vacuum cleaner also includes a processor and a memory connected via a bus. An identified and traversed path is stored in an electronic map in the memory. Every obstacle identified on the path is entered in the map. The vacuum cleaner includes a cable drum for winding up the cable. The cable drum includes a motor to drive the cable drum for unwinding or winding the cable. The vacuum cleaner also includes a steering mechanism, wheels, and a motor for driving the vacuum cleaner along the path.

PCT Published Patent Application No. WO 02/074150 to Personal Robotics and U.S. Published Patent Application No. 2002/0174506 to Wallach et al. and assigned to Personal Robotics disclose a self-propelled canister vacuum cleaner. In one embodiment, the vacuum cleaner is autonomous. In another embodiment, the self-propelled vacuum cleaner is powered by standard utility power via a power cord. The canister vacuum cleaner includes a cleaning head module, a vacuum fan module (i.e., canister), and a hose assembly connecting the cleaning head module with the vacuum fan module. The vacuum fan module includes a controller that performs navigation and control functions for both the vacuum fan module and the cleaning head module. Alternatively, the controller may be separated from the vacuum fan module and the cleaning head module, and can be mobile. The vacuum fan module and the cleaning head module each include a drive mechanism for propulsion. The cleaning head module includes a cleaning brush assembly that can be motorized or air driven. The cleaning head module may also include a microcontroller that communicates with the controller.

However, none of the current robotic canister-like vacuum cleaners allow a user to perform vacuuming manually using one or more components of the self-propelled or autonomous vacuum cleaner. Additionally, current robotic canister-like vacuum cleaners do not provide a learning mode in which a user teaches the vacuum cleaner a remembered (i.e., stored) path for vacuuming an area using a wireless control device.

BRIEF SUMMARY OF INVENTION

Thus, there is a particular need for an improved robotic canister-like vacuum cleaner. The invention contemplates a robotic canister-like vacuum cleaner that overcomes at least one of the above-mentioned problems and others.

In one aspect of the invention, an autonomous robotic vacuum includes a self-propelled controller with a vacuum source, a dirt receptacle, a controller processor, and a power source, a self-propelled cleaning head with a suction inlet and a cleaning processor, and an interconnecting hose. The controller and cleaning head cooperatively traverse a surface area in tandem when the interconnecting hose is connected between the cleaning head and the controller.

In another aspect of the invention, a self-propelled robotic vacuum includes a self-propelled controller with a vacuum source, a dirt receptacle, a controller processor, a power cord dispense/retract assembly, and a power distribution, a self-propelled cleaning head with a suction inlet and a cleaning processor, and an interconnecting hose. The controller and cleaning head cooperatively traverse a surface area in tandem when the interconnecting hose is connected between the cleaning head and the controller.

In still another aspect of the invention, a method of semi-automated environment mapping for a self-propelled robotic vacuum is provided. The robotic vacuum includes a self-propelled controller, a self-propelled cleaning head, a hose, and a remote control. The controller and cleaning head cooperatively traverse a surface area in tandem when the hose is connected between the cleaning head and the controller. The method includes: a) driving the robotic vacuum across a surface area of an environment to be mapped using the remote control, b) detecting characteristics of the environment, including existing obstacles, using localization sensors, c) mapping the environment from the detected characteristics and storing an environment map in a controller processor, and d) determining a route for the robotic vacuum to traverse in order to clean the surface area based on the environment map.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
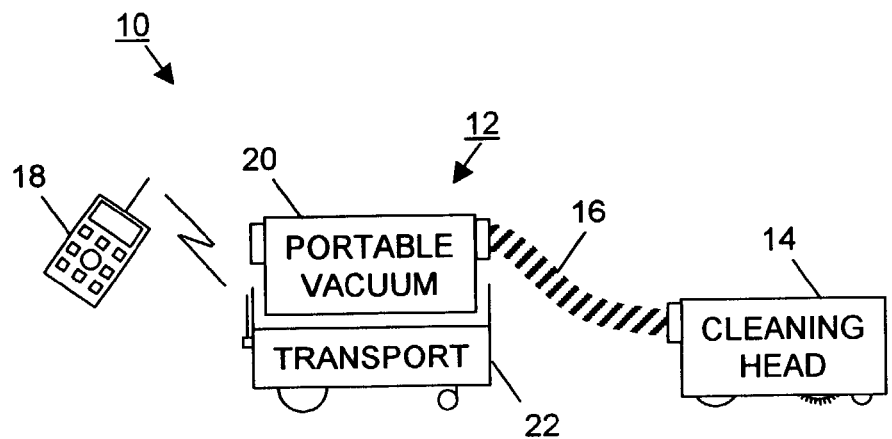
FIG. 1 is a functional block diagram of an embodiment of a robotic canister-like vacuum cleaner.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements.

With reference to FIG. 1, an embodiment of a robotic vacuum 10 includes a controller 12, a cleaning head 14 and hose 16. The robotic vacuum 10 may also include an optional remote control 18. The controller 12 includes a portable vacuum 20 and a transport module 22. The robotic vacuum 10 resembles a conventional canister vacuum and may be referred to as a robotic canister-like vacuum.

The portable vacuum 20 is selectively received (i.e., removably secured) and carried by the transport module 22 and in fluidic communication with the cleaning head 14 via the hose 16. The remote control 18 is in operative communication with the controller 12 and the controller is in operative communication with the cleaning head 14. Essentially, the controller 12 and the cleaning head 14 cooperate by moving in tandem across a surface area to vacuum dirt and dust from the surface during robotic operations. Typically, the cleaning head 14 acts as a slave to the controller 12 for robotic operations. Since the cleaning head 14 is separate from the controller 12 in a tandem configuration, the cleaning head 14 is significantly smaller than the controller 12 and other one-piece robotic vacuums. The small cleaning head 14 can access and clean small or tight areas, including under and around furniture. The portable vacuum 20 may be removed from the transport module 22 for use as a vacuum or blower for manual operations.

The controller 12 performs mapping localization, planning and control for the robotic vacuum 10. The remote control 18 allows a user to "drive" the robotic vacuum throughout the surface area. While the user is performing this function, the controller 12 is learning and mapping a floor plan for the surface area including any existing stationary objects. This includes: i) detecting characteristics of the environment, including existing obstacles, using localization sensors 78 (FIG. 3), ii) mapping the environment from the detected characteristics and storing an environment map in a controller processor 74 (FIG. 3), iii) determining a route for the robotic vacuum 10 to traverse in order to clean the surface area based on the environment map, and iv) storing the route for future reference during subsequent robotic operations. Thus, the optional remote control 18 provides the robotic vacuum 10 with a semi-automated environment-mapping mode. Semi-automated environment mapping allows the vacuuming function to be performed automatically in future uses based on the mapped environment stored in the controller 12.

Figure 2:
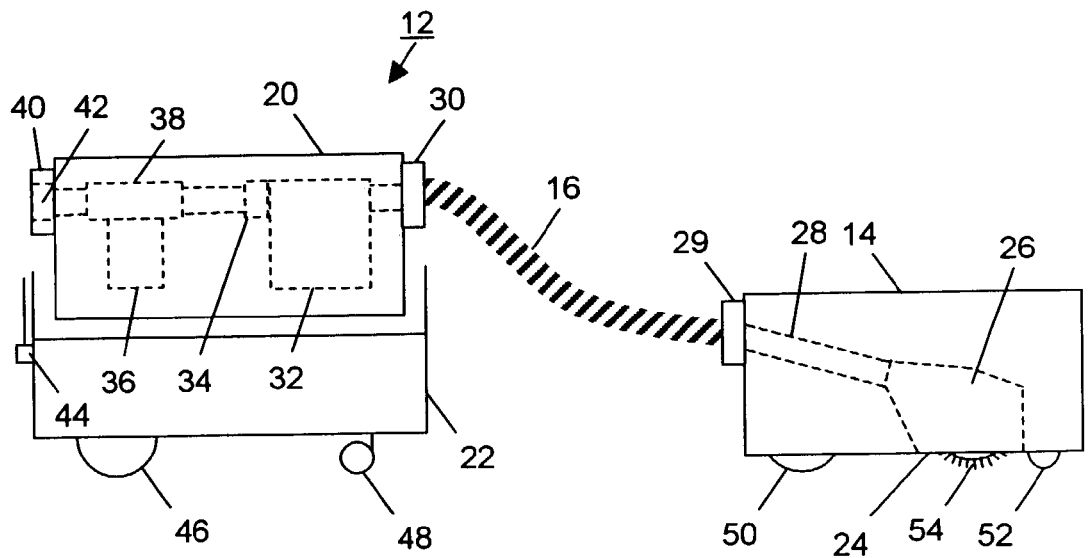
FIG. 2 is a functional block diagram showing a suction airflow path in an embodiment of a robotic canister-like vacuum cleaner.

With reference to FIG. 2, various functions of the major components of the robotic vacuum 10 are shown, including the suction airflow path associated with vacuuming functions. The cleaning head 14 includes a suction inlet 24, a brush chamber 26, a suction conduit 28 and a cleaning head outlet 29. The portable vacuum 20 includes a vacuum inlet 30, a dirt receptacle 32, a primary filter 34, a blower motor 36, a blower 38, a vacuum outlet 40 and a secondary filter 42. The blower motor 36 and the blower 38 are operatively connected when the blower motor 36 is operated. The blower 38 creates an airflow path by blowing air through the vacuum outlet 40. Air is drawn into the airflow path at the suction inlet 24. Thus a suction airflow path is created between the suction inlet 24 and the blower 38. The vacuum or lower pressure in the suction airflow path also draws dirt and dust particles in the suction inlet 24. The dirt and dust particles are retained in the dirt receptacle 32. The dirt receptacle 32 may be dirt cup or canister or a disposable bag, depending on whether a bag-less or bag configuration is implemented.

Additionally, as shown in FIG. 2, the transport module 22 includes an antenna 44, a wheel 46 and a caster 48. The cleaning head 14 also includes a wheel 50, a caster 52 and a brush 54. Typically, the transport module 22 and the cleaning head 14 both include two wheels and one or two casters. However, additional wheels, and/or additional casters are envisioned. Likewise, tracked wheels are envisioned in addition to or in place of the wheels and casters. The wheels are driven to provide self-propelled movement. If the wheels (e.g., 46) are independently controlled, they may also provide steering. Otherwise, one or more of the casters (e.g., 48) may be controlled to provide steering. The configuration of wheel and casters in the cleaning head 14 may be the same or different from the configuration in the transport module 22. Likewise, movement and steering functions in the cleaning head 14 may be controlled in the same or different manner as movement and steering functions in the transport module 22. For vacuuming, depending on the floor type, the brush 54 rotates and assists in collection of dirt and dust particles.

Figure 3:
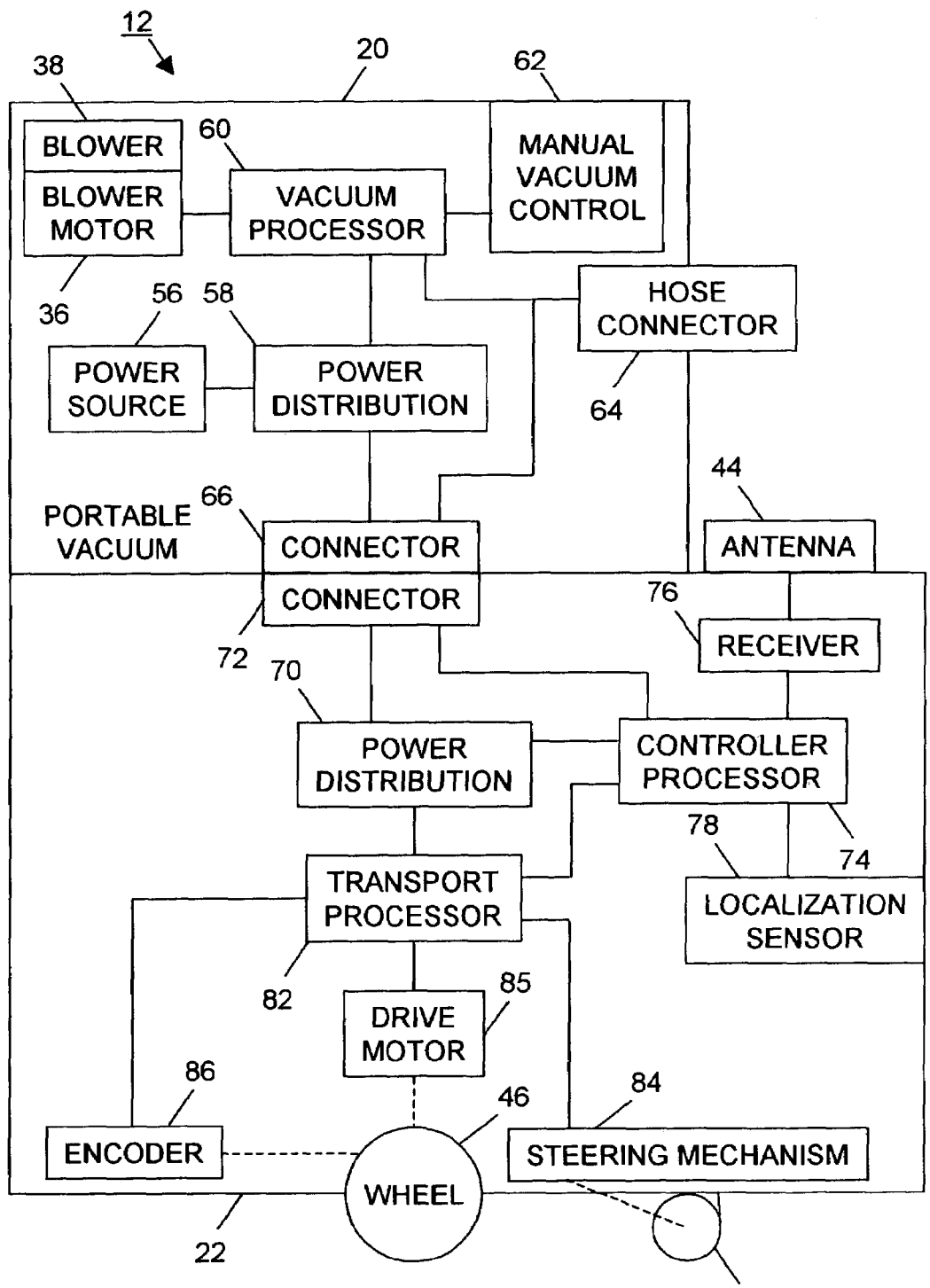
FIG. 3 is a functional block diagram of an embodiment of a controller associated with a robotic canister-like vacuum cleaner.

With reference to FIG. 3, a block diagram of the controller 12 shows additional components within the portable vacuum 20 and the transport module 22. The portable vacuum 20 includes the blower motor 36, blower 38, a power source 56, a power distribution 58, a vacuum processor 60, a manual vacuum control 62, a hose connector 64 and a connector 66. In this embodiment, the power source 56 provides electrical power to both the portable vacuum 20 and the transport module 22. The power source 56 may be a battery, a fuel cell, or a similar suitable source of power. The power source 56 provides power to power distribution 58. Power distribution 58 distributes power to other components within the portable vacuum 20, for example, vacuum processor 60. Power distribution 58 distributes power to the transport module 22 via connector 66. Power distribution 58 may be a terminal strip, discreet wiring, or any suitable combination of components that conduct electrical power to the proper components. For example, if any components within the portable vacuum 20 and/or transport module 22 require a voltage, frequency, or phase that is different than that provided by the power source 56, power distribution 58 may include power regulation, conditioning, and/or conversion circuitry suitable to provide the required voltage(s). In another embodiment, the power source 56 also provides power to the cleaning module 14 (FIG. 4) with power distribution 58 distributing power to the cleaning head via hose connector 64.

The vacuum processor 60 is in communication with the manual vacuum control 62 and the blower motor 36 and controls vacuuming functions within the portable vacuum 20. The manual vacuum control 62, for example, includes a power switch and a power indicator light. The power indicator light may indicate that power has been switched on and/or the power level of the power source 56. In a more simplified embodiment, the vacuum processor 60 is not required and merely replaced by discrete wiring. The portable vacuum 20 is removably secured to the transport module 22 during robotic vacuum cleaning operations. For manual vacuum cleaning operations, the portable vacuum 20 is removed from the transport module 22 and an accessory hose is attached to vacuum inlet 30 (FIG. 2). For manual operations, the portable vacuum 20 functions much like a shop vac or a portable canister vacuum.

In the embodiment being described, the transport module 22 includes the antenna 44, wheel 46, caster 48, a power distribution 70, a connector 72, a controller processor 74, a receiver 76, a localization sensor 78, a transport processor 82, a steering mechanism 84, a drive motor 85 and an encoder 86. Power distribution 70 receives power from the portable vacuum 20 via connector 72. Power is further distributed from power distribution 70 to other components within the transport module 22 including the controller processor 74 and the transport processor 82. Power distribution 70 may be a terminal strip, discreet wiring, or any suitable combination of components that conduct electrical power to the proper components. For example, if any components within the transport module 22 require a voltage, frequency, or phase that is different than that provided by the power source 56, power distribution 70 may include power regulation, conditioning, and/or conversion circuitry suitable to provide the required voltage(s).

A controller processor 74 is in communication with the receiver 76 and the localization sensor 78. During semi-automated operation, the remote control 18 (FIG. 1) transmits driving and other instructions to the controller 12 via the antenna 44. The antenna 44 communicates the instructions to the receiver 76, the receiver 76 in turn communicates the instructions to the controller processor 74. The controller processor 74 provides overall control functions for the robotic vacuum 10 (FIG. 1) including mapping, localization, planning and control functions. The controller processor 74 is in communication with the transport processor 82, the vacuum processor 60 and a cleaning processor 90 (FIG. 4) and coordinates overall operation of the robotic vacuum 10 through the various processors. In one embodiment, the localization sensor 78 includes a pair of digital cameras to provide stereo optical sensing. In other embodiments, the localization sensor may include any combination of optical, sonar, lidar, infrared, touch and any other suitable type of sensors. An environment and surface area to be cleaned may be mapped in a semi-automated mode using the remote control 18 or in an automated mode using the localization sensor 78.

The transport processor 82 controls drive functions for the controller 12. The transport processor 82 is in communication with the steering mechanism 84, the drive motor 85 and the encoder 86. The steering mechanism 84 moves the caster 48 to steer the controller 12. The drive motor 85 is in operative communication with the wheel 46 to turn the wheel forward or backward to propel the controller 12. The encoder 86 is disposed to detect movement of the wheel 46 and provides feedback of wheel movement (e.g., slippage) to the transport processor 82. In the embodiment being described, the drive motor 85 simultaneously controls two wheels 46 and the steering mechanism 84 controls the caster 48. The encoder 86 detects movement of the wheels and provides feedback indicating movement to the transport processor 82. The encoder 86 may also detect wheel spinning to facilitate localization.

In another embodiment having two casters 48, the steering mechanism 84 controls may control both casters independently or by a linkage between the casters or the additional caster may be free moving (i.e., freely turning about a vertical axis). If the transport module 22 includes additional casters, they may be free moving or linked to the steered caster(s). In still another embodiment, the transport module 22 includes two independent drive motors 85 and independently controls the two wheels 46 to provide both movement and steering functions. In this embodiment, each independently controlled drive motor 85/wheel 46 combination provides forward and backward movement. The transport processor 82 controls steering by driving the drive motor 85/wheel 46 combinations in different directions and/or at different speeds. Thus, the steering mechanism 84 is not required.

In various embodiments, the controller processor 74, transport processor 82 and vacuum processor 60 may be combined in one or more processors in any combination. The resulting processor(s) may be located in the portable vacuum 20 or the transport module 22.

Figure 4:
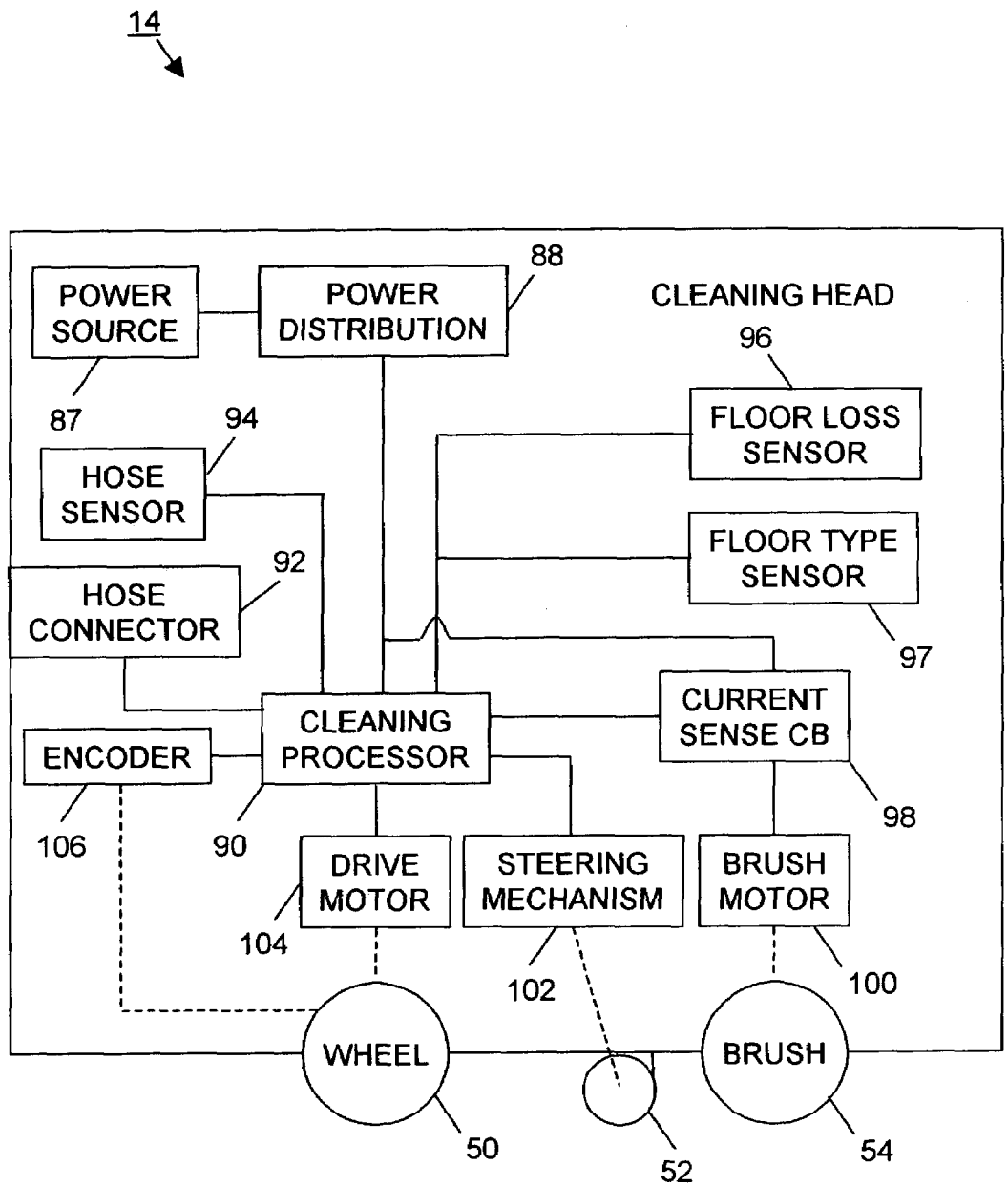
FIG. 4 is a functional block diagram of an embodiment of a cleaning head associated with a robotic canister-like vacuum cleaner.

With reference to FIG. 4, an embodiment of the cleaning head 14 includes the wheel 50, caster 52, brush 54, a power source 87, a power distribution 88, a cleaning processor 90, a hose connector 92, a hose sensor 94, a floor loss sensor 96, a floor type sensor 97, a current sense circuit breaker (CB) 98, a brush motor 100, a steering mechanism 102, a drive motor 104 and an encoder 106. In one embodiment, the brush 54 and the brush motor 100 are combined forming a belt-less brush motor. In this embodiment, the brush is the motor.

Power distribution 88 receives power from power source 87 and distributes power to other components of the cleaning head 14 including the cleaning processor 90. Power distribution 88 may be a terminal strip, discreet wiring, or any suitable combination of components that conduct electrical power to the proper components. For example, if any components within the cleaning head 14 require a voltage, frequency, or phase that is different than that provided by the power source 87, power distribution 88 may include power regulation, conditioning, and/or conversion circuitry suitable to provide the required voltage(s). In another embodiment, the controller 12 (FIG. 3) provides power to the cleaning head 14 and the power source 87 is not required. Power is distributed from the portable vacuum 20 (FIG. 3) along wires with hose 16 (FIGS. 1 and 2) to hose connector 92. From hose connector 92, power is provided to power distribution 88 for distribution throughout the cleaning head.

The cleaning processor 90 controls the brush motor and drive functions for the cleaning head 14 in cooperation with the controller processor 74 (FIG. 3). In the embodiment being described, the cleaning processor 90 is in communication with the controller processor 74 via discrete control signals communicated through hose connector 94, hose 16, hose connector 64 and connector 66 of the portable vacuum 20 (FIG. 3) and connector 72 of the transport module 22 (FIG. 3). The cleaning processor is also in communication with hose sensor 94, floor loss sensor 96, floor type sensor 97, current sense CB 98, steering mechanism 102, drive motor 104 and encoder 106.

Hose sensor 94 detects an obstruction in the suction airflow path. In one embodiment, the hose sensor 94 performs a differential pressure measurement between ambient air and the suction airflow path. In this embodiment, one of the differential pressure ports of the hose sensor 94 is tapped to the atmosphere and the other port is tapped to the suction airflow path. The differential pressure sensor detects an obstruction in the suction airflow path and can distinguish between a blocked hose condition with a full obstruction, a partial obstruction, a full dirt receptacle 32 (FIG. 2), and when the primary filter 34 (FIG. 2) needs to be changed. The cleaning processor 90 communicates the detected conditions to the controller processor 74 and the controller processor determines whether the blower motor 36, brush motor 100 and drive motors 85, 104 should be shut down or controlled differently and/or whether associated indicators should be illuminated and/or alarms should be sounded. Once the controller processor 74 determines a course of action, it communicates appropriate instructions to the vacuum processor 60, transport processor 82 and cleaning processor 90.

The floor loss sensor 96 detects a drop off in the floor that would cause the cleaning head 14 to hang up or fall. For example, the floor loss sensor 96 detects when the cleaning head 14 is at the top of a staircase or when the cleaning head approaches a hole or substantial dip in the surface area being traversed. In one embodiment, the floor loss sensor 96 includes two infrared (IR) detectors mounted approximately 5 cm off the ground at a 20° angle normal to vertical. The floor loss sensor 96 communicates information to the cleaning processor 90. The cleaning processor 90 controls the drive motor 104 and steering mechanism 102 to maneuver the cleaning head 14 in order to avoid the surface area where loss of floor is detected and communicates associated information to the controller processor 74.

The floor type sensor 97 detects the type of floor being traversed and distinguishes between carpeted and non-carpeted surfaces. Floor type information is communicated to the cleaning processor 90. Typically, the cleaning processor operates the brush motor 100 to spin the brush 54 when the surface area is carpeted and stops the brush motor 100 when non-carpeted surfaces are being cleaned. In one embodiment, the floor type sensor uses sonar to detect floor type. The sonar floor type sensor is mounted approximately 3 inches off the floor and runs at approximately 425 KHz. Using this arrangement, the sonar sensor can distinguish between, for example, low cut pile carpet and linoleum.

The current sense CB 98 provides power and over current protection to the brush motor 100. If the brush motor 100, for example, jams, brush motor current is increased. The current sense CB 98 is an electronic device that removes power from the brush motor 100 when an over current condition is sensed. The current sense CB 98 can be reset after, for example, a throw rug jamming the brush 54 is removed from the suction inlet 24 (FIG. 2). The current sense CB 98 may also communicate information to the cleaning processor 90 and the cleaning processor 90 may in turn communicate the over current condition information to the controller processor 74 (FIG. 3) so that additional appropriate actions can be taken during in over current condition. For example, stopping movement of the robotic vacuum 10 and activation of appropriate indicators and/or alarms.

The wheel 50, caster 52, steering mechanism 102, drive motor 104 and encoder 106 of the cleaning head 14 typically operate in the same manner as like components described above for the transport module 22. Likewise, the various alternatives described above for the drive and steering components are also available for the drive and steering components in the cleaning head 14. Nevertheless, the wheel 50, caster 52, steering mechanism 102, drive motor 104 and encoder 106 of the cleaning head 14 may implement one of the alternatives described above while the transport module 22 implements a different alternative.

Figure 5:
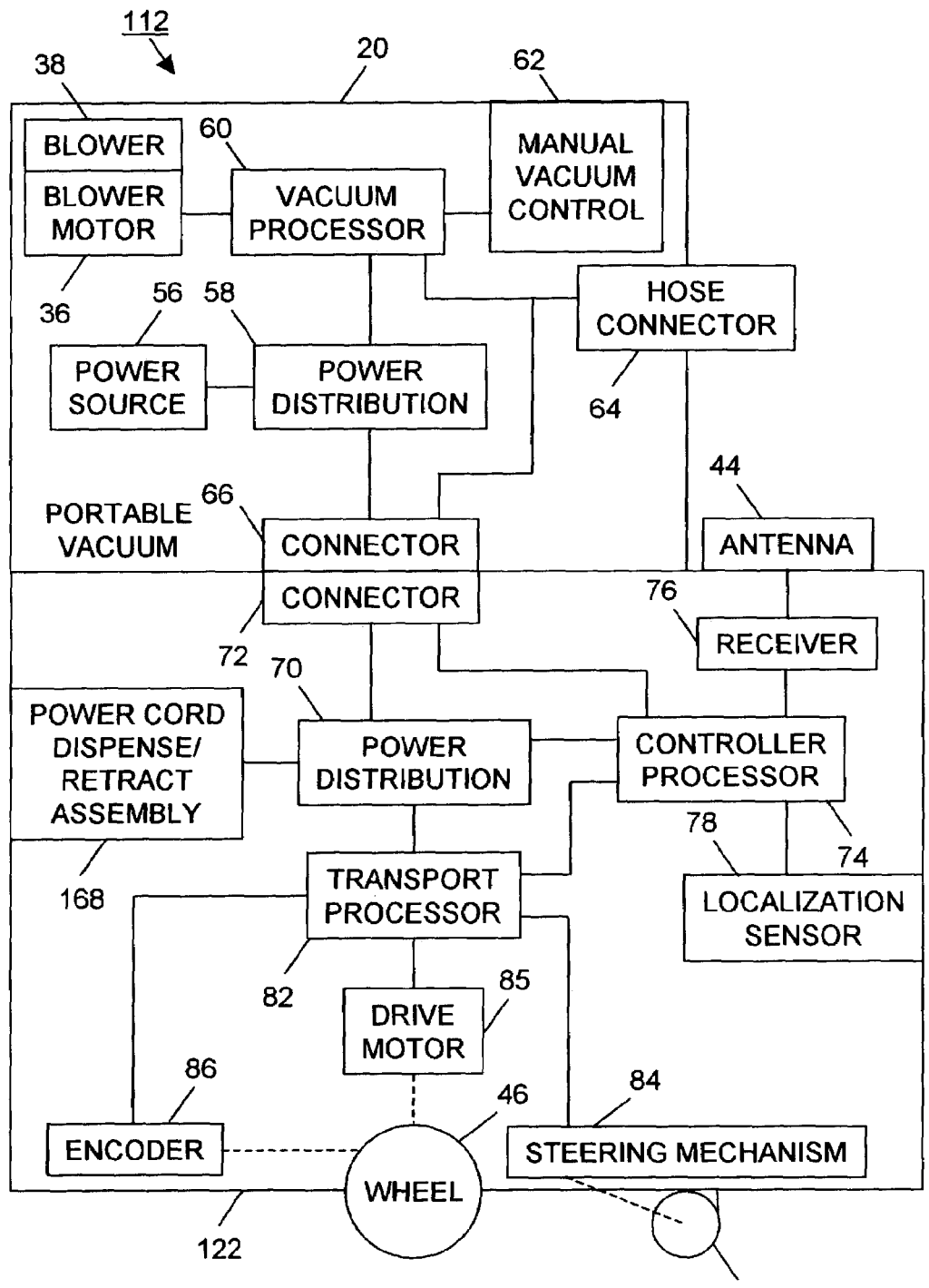
FIG. 5 is a functional block diagram of another embodiment of a controller associated with a robotic canister-like vacuum cleaner.

With reference to FIG. 5, another embodiment of a controller 112 is provided. In this embodiment, the portable vacuum 20 is the same as described above for FIG. 3. The transport module 122 includes the components for the transport module 22 described above for FIG. 3. In addition, the transport module 122 includes a power cord dispense/retract assembly 168. The power cord dispense/retract assembly 168 includes a power cord that can be connected to a standard utility power receptacle to provide AC power to the controller 112. During robotic operations, the power cord dispense/retract assembly dispenses the cord from a reel as the robotic vacuum 10 moves away from the utility power receptacle and winds the cord onto the reel as the robotic vacuum 10 moves closer to the utility power receptacle. This prevents the cord from becoming tangled and from catching on the controller 112 or cleaning head 14. In this embodiment, power distribution 70 may include components to convert the AC power to DC power and to regulate the DC power (e.g., power supplies).

During robotic operations, the robotic vacuum 10 may be powered by either the power source 56 in the portable vacuum 20 or standard utility power via the power cord dispense/retract assembly 168. Additionally, during inactive periods, connecting the cord from the power cord dispenser/retract assembly 168 to a standard utility power receptacle may recharge the power source 56. In the embodiment being described, manual cleaning operations using the portable vacuum 20 are the same as described above for FIGS. 1–3.

Figure 6:
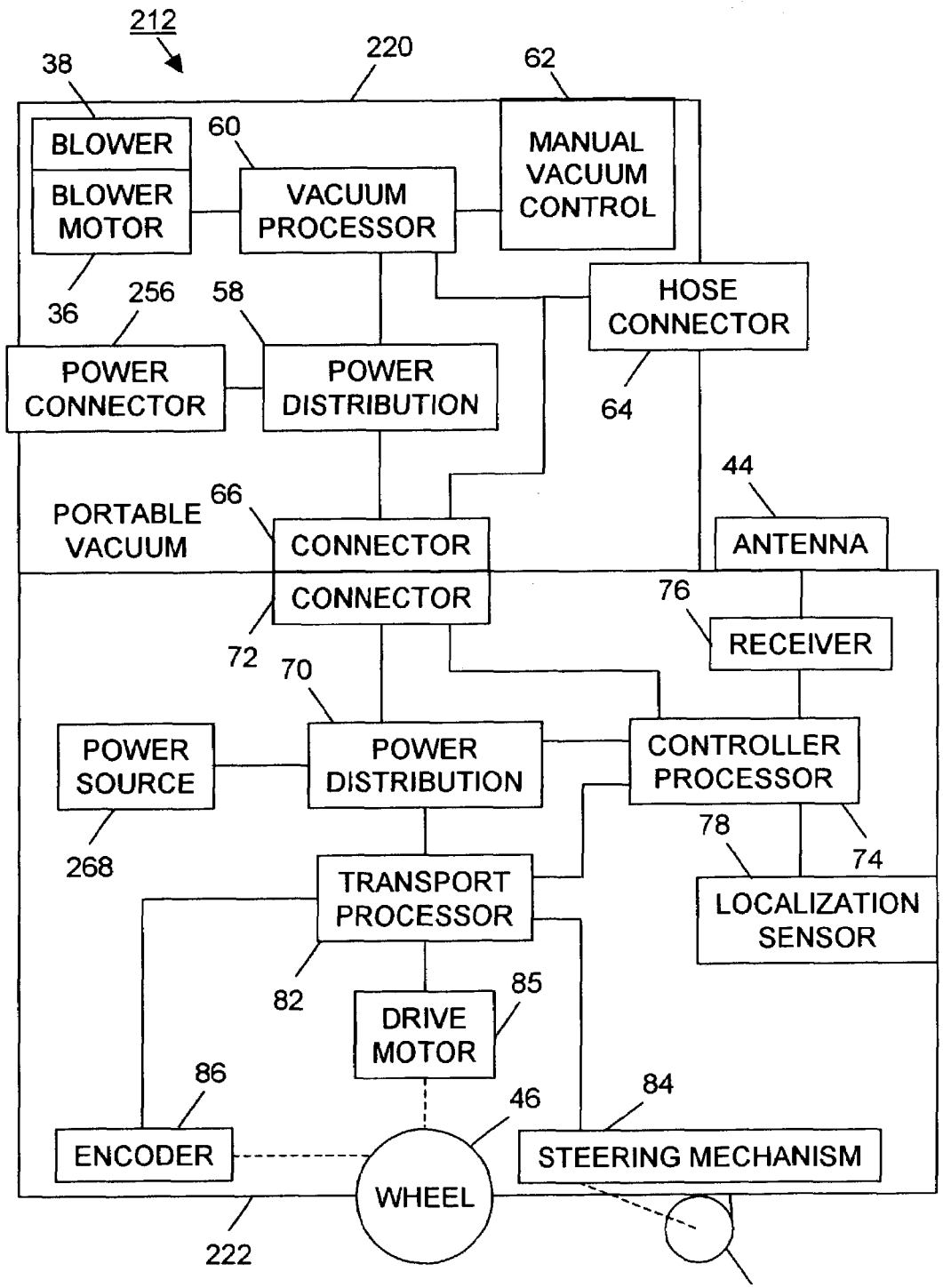
FIG. 6 is a functional block diagram of yet another embodiment of a controller associated with a robotic canister-like vacuum cleaner.

With reference to FIG. 6, yet another embodiment of a controller 212 includes a portable vacuum 220 and a transport module 222. The portable vacuum 220 is similar to the portable vacuum 20 of FIG. 3. One difference is that power source 56 in portable vacuum 20 is replaced with a power connector 256 in portable vacuum 220. The power connector 256 is adapted to mate with an accessory power cord 213 (FIG. 12) to provide AC utility power to the portable vacuum during manual operations. In this embodiment, power distribution 58 may include components to convert the AC power to DC power and to regulate the DC power (e.g., power supplies).

The transport module 222 includes the components of transport module 22 of FIG. 3, as well as a power source 268. The power source 268 is the same type as described above for power source 56 of FIG. 3. In the embodiment being described, the power source 56 is essentially relocated to the transport module 222 as power source 268. During robotic operations, power source 268 provides power to both the portable vacuum 220 and the transport module 222. During inactive periods, connecting the accessory power cord 213 (FIG. 12) from the power connector 256 to a standard utility power receptacle may recharge the power source 268.

Figure 7:
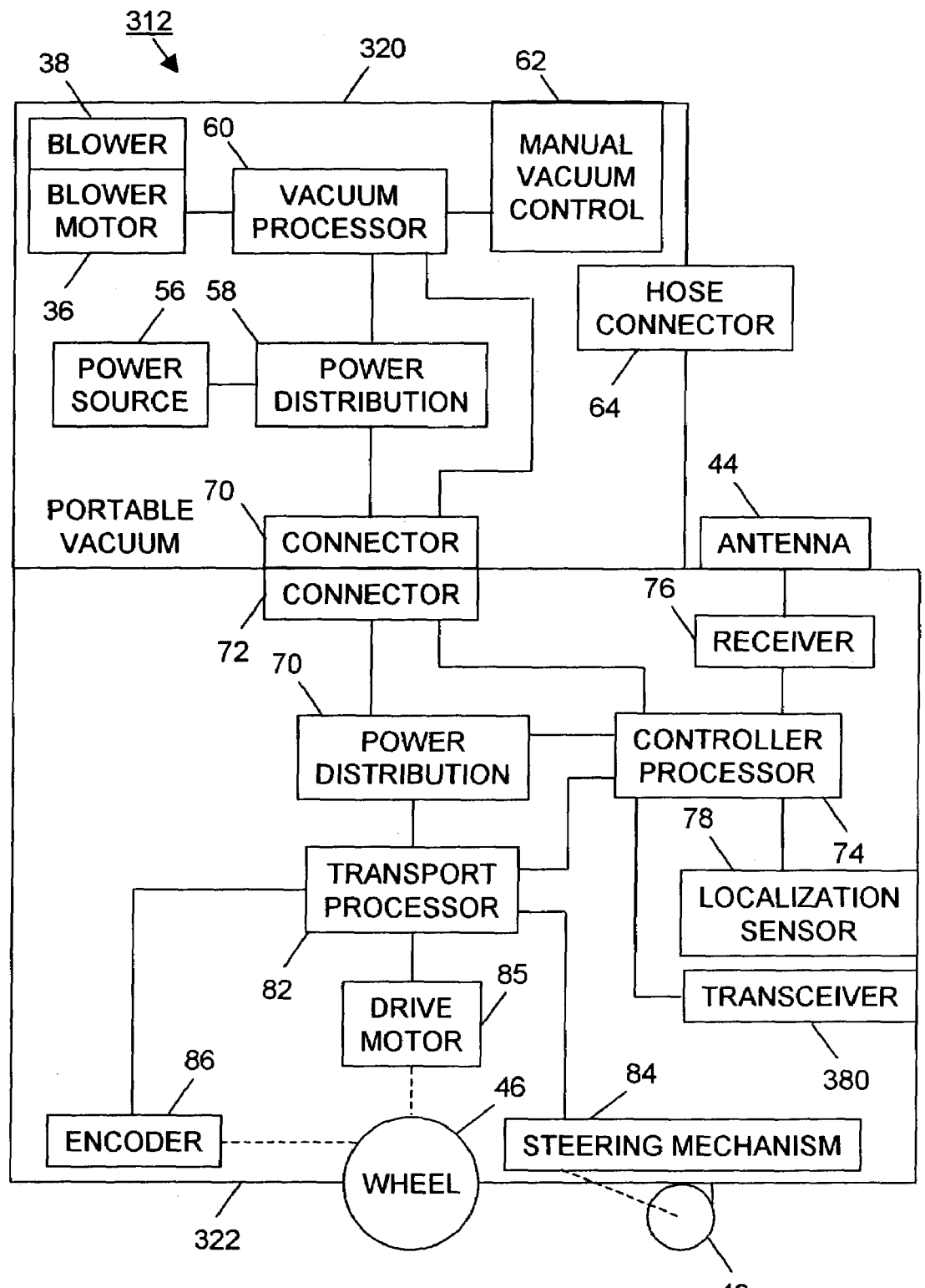
FIG. 7 is a functional block diagram of still yet another embodiment of a controller associated with a robotic canister-like vacuum cleaner.
Figure 8:
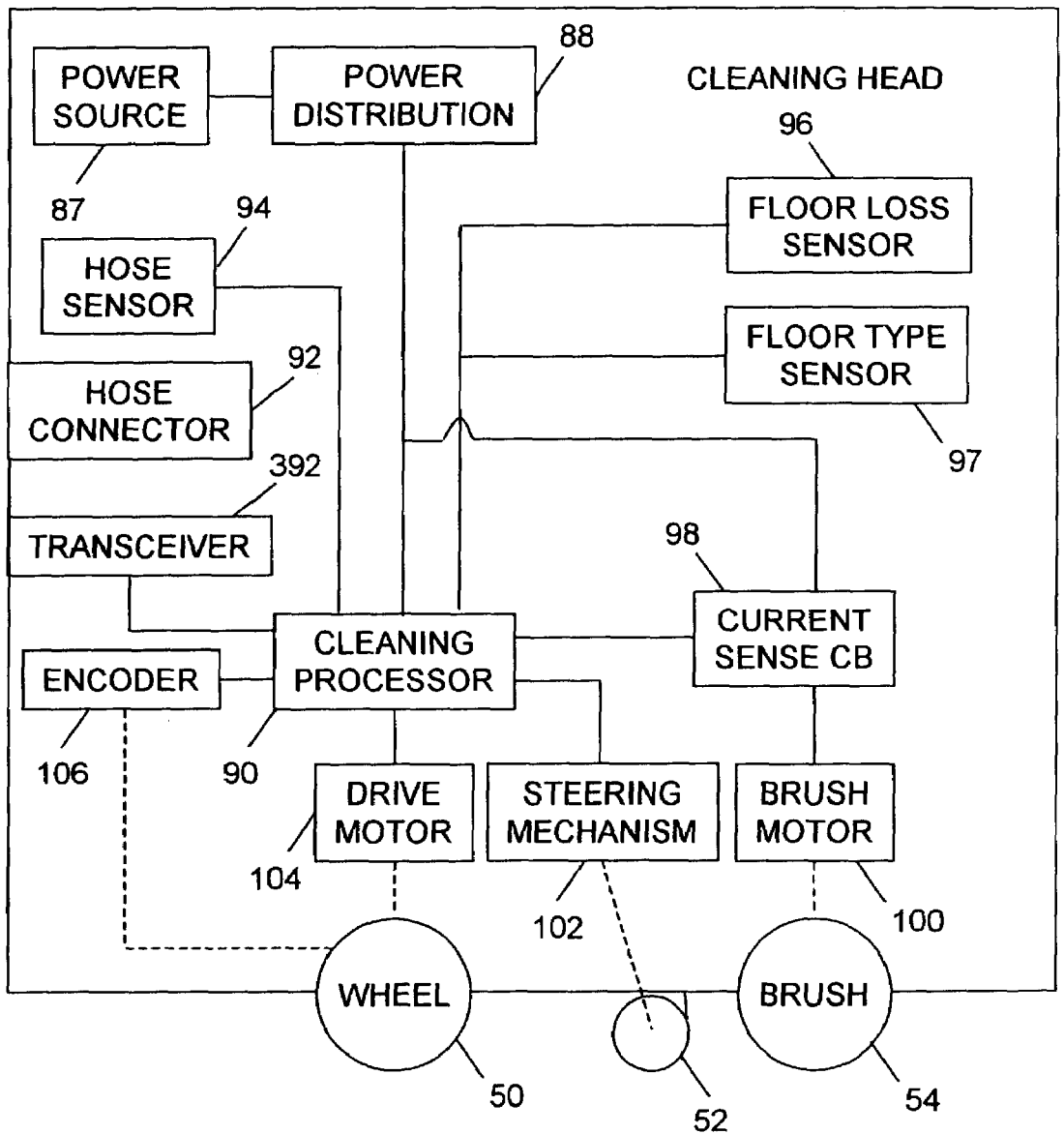
FIG. 8 is a functional block diagram of an embodiment of a cleaning head associated with the controller of FIG. 7.

With reference to FIGS. 7 and 8, another embodiment of a robotic vacuum 10 includes a controller 312 (FIG. 7) in communication with a cleaning head 314 (FIG. 8) via wireless communications. Any suitable form of wireless technology may be implemented. For example, infrared or low power RF. By implementing wireless communication technology, control wires between the controller 312 and the cleaning head 314 are eliminated. Therefore, the hose connector 64 in the portable vacuum 20 and the hose connector 92 in the cleaning head 14, as well as hose 16 do not include the control wires described above for other embodiments (FIGS. 3–6).

The portable vacuum 320 includes the components of the portable vacuum 20 of FIG. 3 (except hose connector 64 no longer provides any electrical functions). The transport module 322 includes the components in transport module 22 of FIG. 3 and also includes a transceiver 380 to transmit and receive communications to/from the cleaning head 314. Similarly, the cleaning head 314 includes the components in cleaning head 14 of FIG. 4 (except hose connector 92 no longer provides any electrical functions) and also includes a transceiver 392. Transceiver 392 transmits and receives communications to/from the controller 312. Separate transmitters and receivers may replace one or both of the transceivers 380, 392. In an alternative embodiment, where communications from the cleaning head 314 to the controller 312 are not required, a transmitter may replace the transceiver 380 in the transport module 322 and a receiver may replace the transceiver 392 in the cleaning head 314.

Robotic and manual operations for the robotic vacuum 10 formed by the controller 312 of FIG. 7 and the cleaning head 314 of FIG. 8 and implementing wireless communications are the same as described above for FIGS. 1–6.

Figure 9:
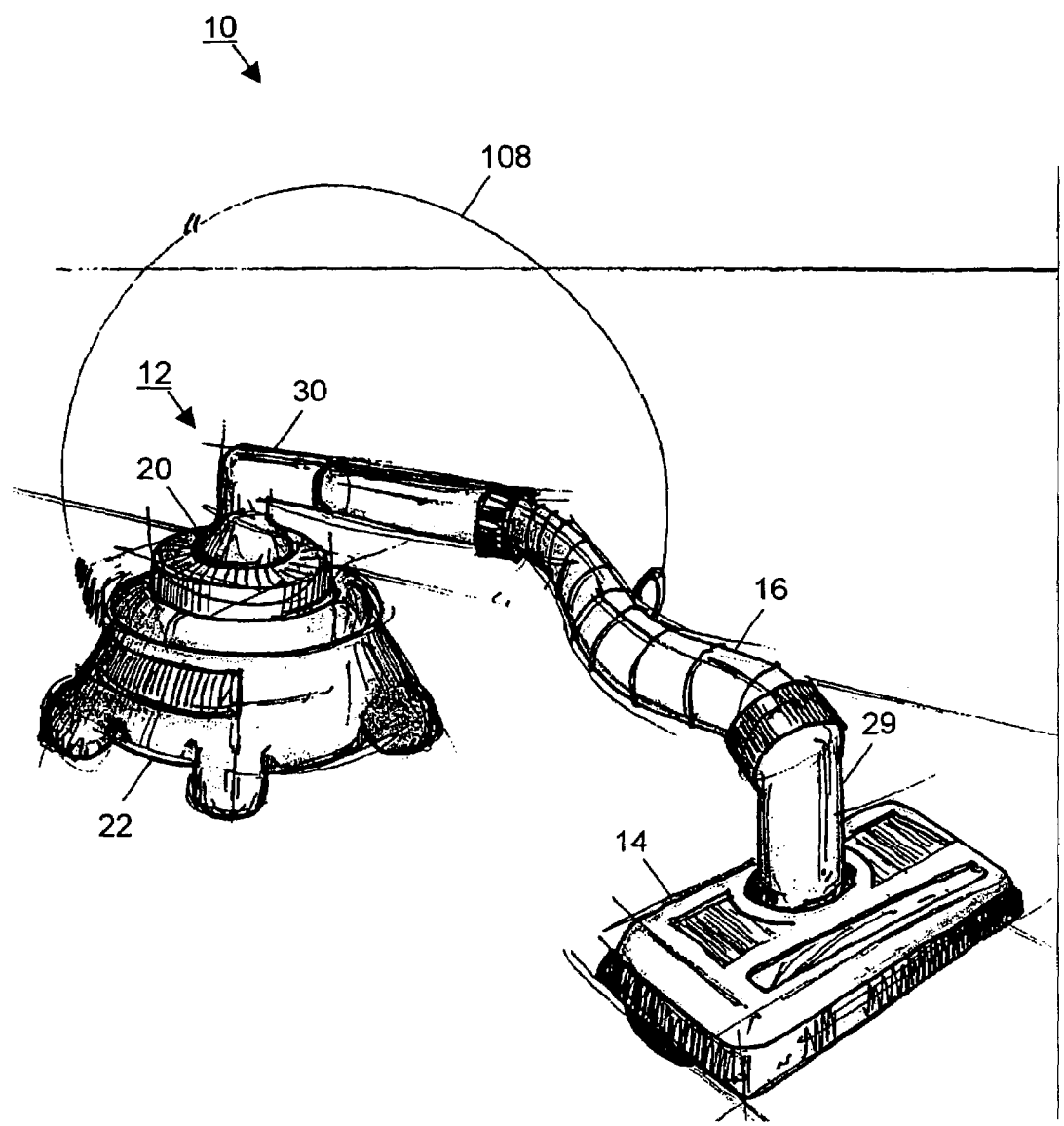
FIG. 9 is a stylized drawing of an embodiment of a robotic canister-like vacuum cleaner.

With reference to FIG. 9, a stylized drawing of one embodiment of a robotic vacuum 10 depicts the controller 12 and the cleaning head 14 interconnected via the hose 16. The controller includes the portable vacuum 20 and the transport module 22. The hose 16 attaches to the vacuum inlet 30 in the portable vacuum 20 and to the cleaning head outlet 29. The vacuum inlet 30 is disposed at the top of the portable vacuum 20 and includes vertical and horizontal portions meeting at a 90° angle. The vacuum inlet 30 is rigid and swivels along an axis of the vertical portion. The horizontal portion of the vacuum inlet 30 may be extendably adjustable. Similarly, the cleaning head outlet 29 includes a vertical portion disposed at the top of the cleaning head and an angled portion for receiving the hose 16. The cleaning head outlet 29 swivels on an axis of the vertical portion. The hose 16 is flexible and received by the horizontal portion of the vacuum inlet 30 and the angled portion of the cleaning head outlet 29. It is preferred for the hose 16 to not drag on the floor or surface area during robotic operations. In other embodiments of the robotic vacuum 10, swiveling both the cleaning head outlet 29 and the vacuum inlet 30 may not be required. For example, swiveling only the cleaning head outlet 29 or only the vacuum inlet 30 may be sufficient.

In the embodiment being described, a tensioning mechanism 108 is attached to the transport module 22 and the hose 16. The tensioning mechanism 108 extends upward and acts like a bent fishing rod. The tensioning mechanism 108 may be a spring steel type wire or other suitable material. Other tensioning mechanisms for supporting the hose are also contemplated. For example, the hose 16 may be constructed of materials that prevent sagging while maintaining suitable flexibility, such as various types of wire or fiber.

Figure 10:
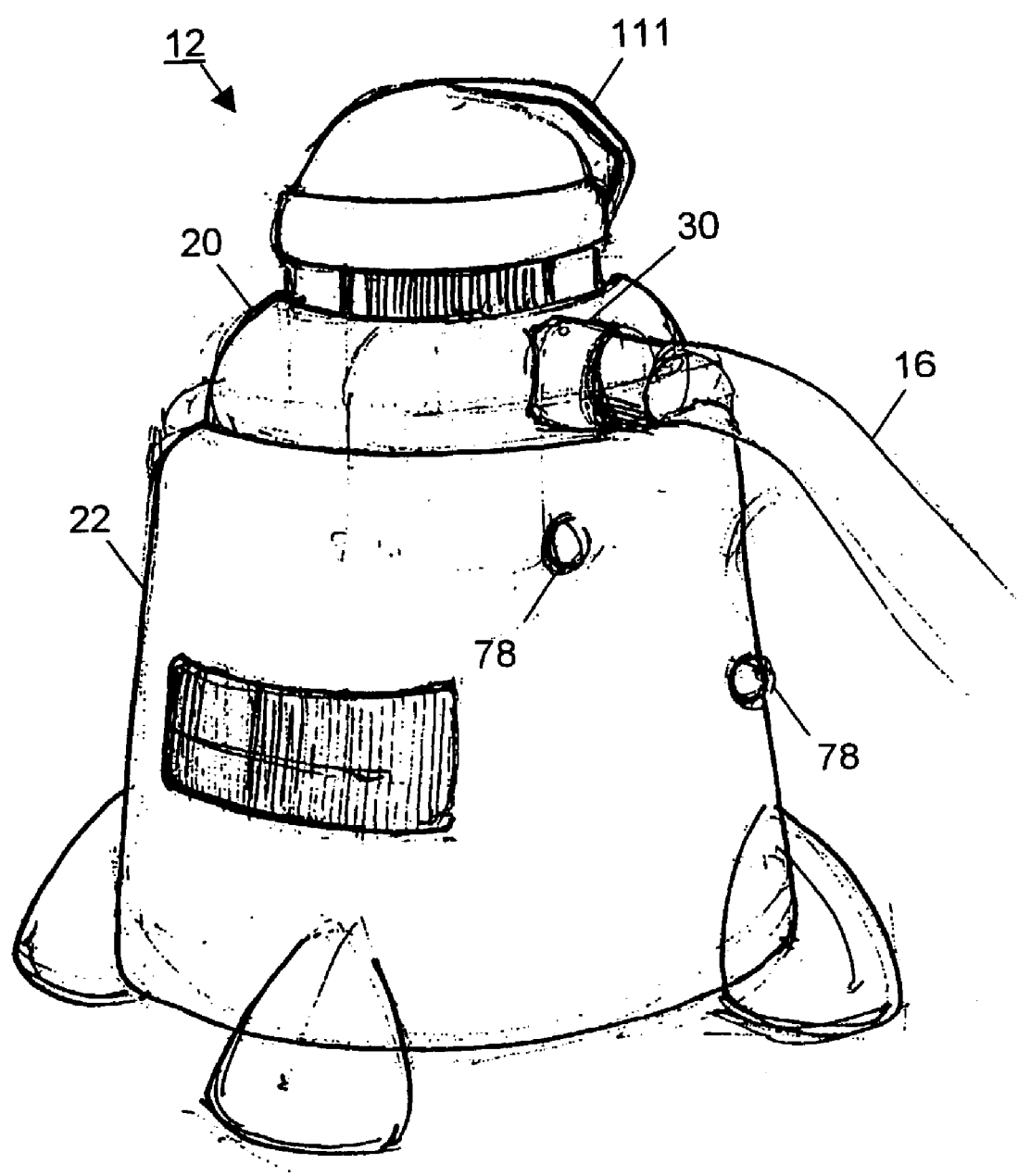
FIG. 10 is a stylized drawing of an embodiment of a controller associated with a robotic canister-like vacuum cleaner with a hose attached.

With reference to FIG. 10, another embodiment of the controller 12 is shown with the hose 16 attached to the vacuum inlet 30 of the portable vacuum 20. The portable vacuum 20 is shown secured to the transport module 22 for robotic operations. The portable vacuum 20 includes a handle 111. The transport module 22 includes two localization sensors 78. In the embodiment being described, the localization sensors 78 are cameras. On the front face of the transport module 22, the cameras are spaced apart and disposed at an angle roughly 45° to normal. In this configuration, the two cameras provide stereovision for depth recognition as well as surface recognition (i.e., three dimensional).

Figure 11:
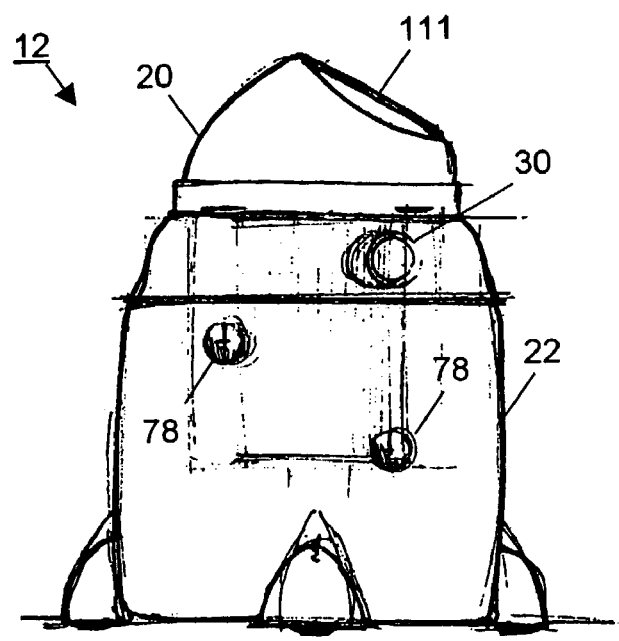
FIG. 11 is a stylized drawing of another embodiment of a controller associated with a robotic canister-like vacuum cleaner.

With reference to FIG. 11, another embodiment of a controller 12 similar to the controller 12 of FIG. 10 is shown without hose 16. In this embodiment, the controller 12 includes the portable vacuum 20 and transport module 22. The portable vacuum 20 includes a vacuum inlet 30 and a handle 111. The transport module 22 includes two localization sensors 78 arranged in the same manner as in FIG. 10.

Figure 12:
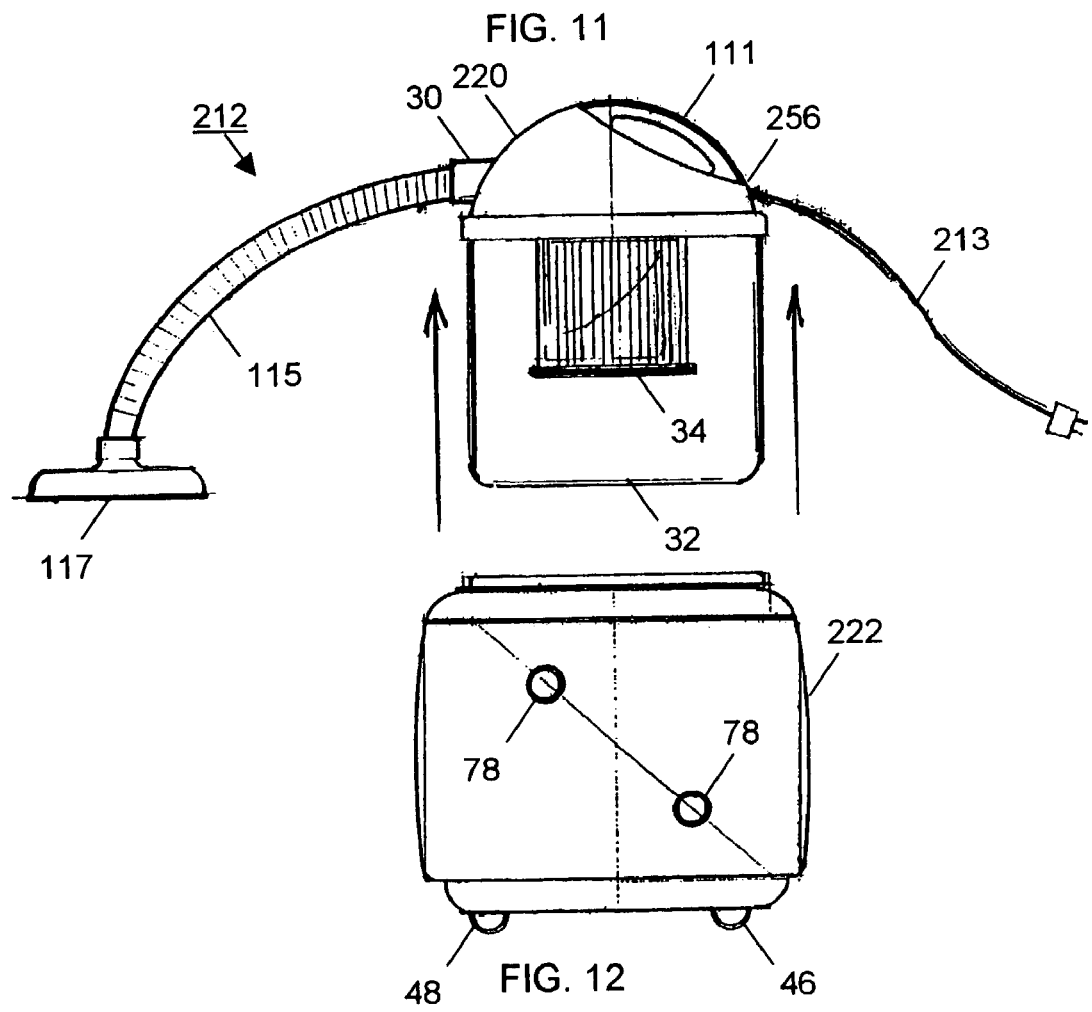
FIG. 12 is a stylized drawing of an embodiment of a controller of a robotic canister-like vacuum cleaner with a portable vacuum removed from an associated transport module.

With reference to FIG. 12, a stylized drawing of another embodiment of a controller 212 shows the portable vacuum 220 removed from the transport module 222 for manual operations. The portable vacuum 220 includes the vacuum inlet 30, dirt receptacle 32, primary filter 34, handle 111 and power connector 256. An accessory hose 115 is attached to the vacuum inlet 30 and an accessory nozzle 117 is attached to the other end of the hose. An accessory cord 213 is attached to the power connector 256. The transport module includes the wheel 46, caster 48 and two localization sensors 78. In this embodiment, once the portable vacuum 220 is removed from the transport module 222 and the accessory components are installed, the portable vacuum is ready for a user to perform manual operations. For example, vacuuming steps or furniture upholstery or blowing dust and/or dirt from one area to another.

One of ordinary skill in the art will recognize how certain configurations of the portable vacuum (e.g., FIGS. 1 and 2), the vacuum may also be used as a portable blower when an accessory is attached to the vacuum outlet 40 rather than the vacuum inlet 30. The accessory hose 115 or other suitable accessories may be used in this portable blower configuration for blowing dust, dirt, and other small items around for various purposes. Many of the portable vacuums 20 that are convertible into blowers are similar to common shop vacs that also converted between vacuum and blower operation.

In one embodiment of the robotic vacuum 10, one or more of the motors (i.e., drive motor 85, drive motor 104, brush motor 100) are brush-less DC motors. Along with each brush-less DC motor, a 3-phase motor driver is provided to apply power sequences that control the direction and speed of the motor. Hitachi® provides various single chip solutions that are suitable for the 3-phase motor driver.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

What is claimed is:

1. An autonomous robotic vacuum (10), including:
    a self-propelled controller (12), including:
        a vacuum source (36, 38);
        a dirt receptacle (32) in fluidic communication with the vacuum source;
        a controller processor (74) providing mapping, localization, planning, and master control functions; and
        a power source (56, 268) for distributing power;
    a self-propelled cleaning head (14) in communication with the controller, the cleaning head including;
        a suction inlet (24) in fluidic communication with the dirt receptacle; and
        a cleaning processor (90) providing slave control functions; and
    an interconnecting hose (16) connecting the cleaning head to the controller and providing a suction airflow path from the suction inlet to the dirt receptacle;
    wherein the controller and cleaning head cooperatively traverse a surface area in tandem when the interconnecting hose is connected between the cleaning head and the controller.

2. The autonomous robotic vacuum as set forth in claim 1, further including:
    a remote control (18) in operative communication with the controller for driving the robotic vacuum during semi-automatic environment mapping of a surface area to be cleaned.

3. The autonomous robotic vacuum as set forth in claim 1, the controller further including:
    a transport module (22); and
    a portable vacuum (20) removably secured to the transport module, the portable vacuum including a vacuum inlet (30) and a vacuum outlet (40).

4. The autonomous robotic vacuum as set forth in claim 3, wherein the vacuum source, dirt receptacle, and power source are associated with the portable vacuum and the portable vacuum serves as a manual vacuum device after removal from the autonomous robotic vacuum when an accessory hose (115) is connected to the vacuum inlet.

5. The autonomous robotic vacuum as set forth in claim 3, wherein the vacuum source, dirt receptacle, and power source are associated with the portable vacuum and the portable vacuum serves as a manual blower device after removal from the autonomous robotic vacuum when an accessory hose (115) is connected to the vacuum outlet.

6. The autonomous robotic vacuum as set forth in claim 3, wherein the vacuum source and dirt receptacle are associated with the portable vacuum and the portable vacuum serves as a manual vacuum device after removal from the autonomous robotic vacuum when an accessory hose (115) is connected to the vacuum inlet and an accessory power cord (213) is connected to a power connector (256) associated with the portable vacuum and a standard utility power receptacle.

7. The autonomous robotic vacuum as set forth in claim 3, wherein the vacuum source and dirt receptacle are associated with the portable vacuum and the portable vacuum serves as a manual blower device after removal from the autonomous robotic vacuum when an accessory hose (115) is connected to the vacuum outlet and an accessory power cord (213) is connected to a power connector (256) associated with the portable vacuum and a standard utility power receptacle.

8. The autonomous robotic vacuum as set forth in claim 1, further including:
    a tensioning mechanism (108) supporting the interconnecting hose when the interconnecting hose is connected between the cleaning head and the controller.

9. The autonomous robotic vacuum as set forth in claim 1, the controller further including:
    a power cord dispense/retract assembly (172) for connection to a standard utility power receptacle to power the robotic vacuum and to recharge the power source; and
    a power distribution (70) for distributing power from the power cord dispense/retract assembly.

10. The autonomous robotic vacuum as set forth in claim 1, the controller further including:
    a power connector (256) for connecting an accessory power cord (213) between a standard utility power receptacle and the robotic vacuum to recharge the power source.

11. The autonomous robotic vacuum as set forth in claim 1, the interconnecting hose including:
wires to distribute power from the controller to the cleaning head.

12. The autonomous robotic vacuum as set forth in claim 1, the cleaning head further including:
a power source (87) providing power to the cleaning head.

13. The autonomous robotic vacuum as set forth in claim 1, the cleaning head further including:
a hose sensor (94) in communication with the cleaning processor to detect an obstruction in the suction airflow path.

14. The autonomous robotic vacuum as set forth in claim 13, wherein the hose sensor is a differential pressure sensor and distinguishes between a full obstruction, a partial obstruction, an obstruction caused by a full dirt receptacle, and an obstruction caused by a full primary filter.

15. The autonomous robotic vacuum as set forth in claim 1, the cleaning head further including:
a floor loss sensor (96) in communication with the cleaning processor to detect a drop off in a portion of the surface area that would cause the cleaning head to hang up or fall.

16. The autonomous robotic vacuum as set forth in claim 15, wherein the floor loss sensor includes at least two infrared sensors.

17. The autonomous robotic vacuum as set forth in claim 1, the cleaning head further including:
a floor type sensor (97) in communication with the cleaning processor to detect whether a portion of the surface area is carpeted or non-carpeted.

18. The autonomous robotic vacuum as set forth in claim 17, wherein the floor type sensor includes is a sonar type sensor.

19. The autonomous robotic vacuum as set forth in claim 1, the cleaning head further including:
a brush motor (100) controlling a brush (54) to assist in collection of dirt and dust particles through the suction inlet; and
a current sense circuit breaker (98) in communication with power distribution, the cleaning processor, and the brush motor to apply and remove power to the brush motor and, when power is applied, to detect an over current condition.

20. The autonomous robotic vacuum as set forth in claim 19, wherein the brush motor and brush are combined to form a belt-less brush.

21. The autonomous robotic vacuum as set forth in claim 19, wherein the cleaning head further including:
a three-phase motor controller in communication with power distribution, the cleaning processor, and the brush motor, wherein the brush motor is a brush-less DC motor.

22. The autonomous robotic vacuum as set forth in claim 1, the interconnecting hose including:
wires to communicate control signals between the controller and the cleaning head.

23. The autonomous robotic vacuum as set forth in claim 1, further including:
a first transceiver (380) in the controller and in communication with the controller processors; and
a second transceiver (392) in the cleaning head and in communication with the first transceiver and the cleaning processor for wirelessly communicating control signals between the controller and the cleaning head.

24. A self-propelled robotic vacuum (10), including:
a self-propelled controller (12), including:
a vacuum source (36, 38);
a dirt receptacle (32) in fluidic communication with the vacuum source;
a controller processor (74) providing mapping, localization, planning, and master control functions;
a power cord dispense/retract assembly (172) for connection to a standard utility power receptacle; and
a power distribution (70) for distributing power from the power cord dispense/retract assembly;
a self-propelled cleaning head (14) in communication with the controller, including;
a suction inlet (24) in fluidic communication with the dirt receptacle; and
a cleaning processor (90) providing slave control functions; and
an interconnecting hose (16) connecting the cleaning head to the controller and providing a suction airflow path from the suction inlet to the dirt receptacle;
wherein the controller and cleaning head cooperatively traverse a surface area in tandem when the interconnecting hose is connected between the cleaning head and the controller.

25. The self-propelled robotic vacuum as set forth in claim 24, the cleaning head further including:
a power source (87) providing power to the cleaning head.

26. The self-propelled robotic vacuum as set forth in claim 25, wherein the power source in the cleaning head includes at least one of a battery and a fuel cell.

27. The self-propelled robotic vacuum as set forth in claim 24, the controller further including:
a transport module (22); and
a portable vacuum (20) removably secured to the transport module, the portable vacuum including a vacuum inlet (30), a vacuum outlet (40), and a power source (56).

28. The self-propelled robotic vacuum as set forth in claim 27, wherein the vacuum source and dirt receptacle are associated with the portable vacuum and the portable vacuum serves as a manual vacuum device after removal from the autonomous robotic vacuum when an accessory hose (115) is connected to the vacuum inlet.

29. The self-propelled robotic vacuum as set forth in claim 27, wherein the vacuum source and dirt receptacle are associated with the portable vacuum and the portable vacuum serves as a manual blower device after removal from the autonomous robotic vacuum when an accessory hose (115) is connected to the vacuum outlet.

30. The self-propelled robotic vacuum as set forth in claim 27, wherein the power source in the portable vacuum includes at least one of a battery and a fuel cell.

31. The self-propelled robotic vacuum as set forth in claim 24, the controller further including:
a transport module (22); and
a portable vacuum (20) removably secured to the transport module, the portable vacuum including a vacuum inlet (30), a vacuum outlet (40), and a power connector (256).

32. The self-propelled robotic vacuum as set forth in claim 31, wherein the vacuum source and dirt receptacle are associated with the portable vacuum and the portable vacuum serves as a manual vacuum device after removal from the autonomous robotic vacuum when an accessory hose (115) is connected to the vacuum inlet and an accessory power cord (213) is connected to the power connector associated with the portable vacuum and a standard utility power receptacle.

33. The self-propelled robotic vacuum as set forth in claim 31, wherein the vacuum source and dirt receptacle are associated with the portable vacuum and the portable vacuum serves as a manual blower device after removal from the autonomous robotic vacuum when an accessory hose (115) is connected to the vacuum outlet and an accessory power cord (213) is connected to the power connector associated with the portable vacuum and a standard utility power receptacle.

34. The self-propelled robotic vacuum as set forth in claim 24, the controller further including:
- a transport processor (82) in communication with the controller processor for controller movement and steering for the controller;
- a first wheel (46);
- a first brush-less DC drive motor (85) in operative communication with the first wheel; and
- a first three-phase motor controller in communication with power distribution, the transport processor, and the first drive motor for controlling speed and direction of the first drive motor.

35. The self-propelled robotic vacuum as set forth in claim 34, the controller further including:
- a second wheel (46), wherein the first brush-less DC drive motor is in operative communication with the second wheel;
- a first caster (48); and
- a steering mechanism (84) in communication with the transport processor for turning the first caster about a vertical axis to steer the controller.

36. The self-propelled robotic vacuum as set forth in claim 34, the controller further including:
- a second wheel (46);
- a second brush-less DC drive motor (85) in operative communication with the second wheel; and
- a second three-phase motor controller in communication with power distribution, the transport processor, and the second drive motor for controlling speed and direction of the second drive motor;
- wherein the transport processor steers the controller by controlling first and second three-phase motor controllers.

37. The self-propelled robotic vacuum as set forth in claim 24, the cleaning further including:
- a first wheel (50);
- a first brush-less DC drive motor (104) in operative communication with the first wheel; and
- a first three-phase motor controller in communication with power distribution, the cleaning processor, and the first drive motor for controlling speed and direction of the first drive motor.

38. The self-propelled robotic vacuum as set forth in claim 37, the controller further including:
- a second wheel (50), wherein the first brush-less DC drive motor is in operative communication with the second wheel;
- a first caster (52); and
- a steering mechanism (102) in communication with the cleaning processor for turning the first caster about a vertical axis to steer the cleaning head.

39. The self-propelled robotic vacuum as set forth in claim 37, the controller further including:
- a second wheel (50);
- a second brush-less DC drive motor (104) in operative communication with the second wheel; and
- a second three-phase motor controller in communication with power distribution, the cleaning processor, and the second drive motor for controlling speed and direction of the second drive motor;
- wherein the cleaning processor steers the cleaning head by controlling first and second three-phase motor controllers.

40. A method of semi-automated environment mapping in a self-propelled robotic vacuum (10), the robotic vacuum including a self-propelled controller (12), a self-propelled cleaning head (14) in communication with the controller, and a hose (16) providing an airflow path from the cleaning head to the controller, a remote control (18) in operative communication with the controller, wherein the controller and cleaning head cooperatively traverse a surface area in tandem when the hose is connected between the cleaning head and the controller, the method including the steps:
- a) driving the robotic vacuum across a surface area of an environment to be mapped using the remote control;
- b) detecting characteristics of the environment, including existing obstacles, using localization sensors (78);
- c) mapping the environment from the detected characteristics and storing an environment map in a controller processor (74); and
- d) determining a route for the robotic vacuum to traverse in order to clean the surface area based on the environment map.

41. The method as set forth in claim 40, further including the step:
- e) storing the route for future reference during subsequent robotic operations, including robotic cleaning operations.

42. An autonomous robotic vacuum (10), including:
- a self-propelled controller (12) providing mapping, localization, planning, and master control functions, including:
  - a transport module (22); and
  - a portable vacuum (20) removably secured to the transport module, the portable vacuum;
- a self-propelled cleaning head (14) in communication with the controller; and
- an interconnecting hose (16) connecting the cleaning head to the controller and providing a suction airflow path from the cleaning head to the controller;
- wherein the controller and cleaning head cooperatively traverse a surface area in tandem when the interconnecting hose is connected between the cleaning head and the controller.

43. The autonomous robotic vacuum as set forth in claim 42, further including:
- a remote control (18) in operative communication with the controller for driving the robotic vacuum during semi-automatic environment mapping of a surface area to be cleaned.

44. The autonomous robotic vacuum as set forth in claim 42, the portable vacuum further including:
- a vacuum source (36, 38);
- a dirt receptacle (32) in fluidic communication with the vacuum source; and
- a power source (56, 268) for distributing power.

45. The autonomous robotic vacuum as set forth in claim 44, wherein the portable vacuum serves as a manual vacuum device after removal from the autonomous robotic vacuum when an accessory hose (115) is connected to including a vacuum inlet (30) associated with the portable vacuum.

46. The autonomous robotic vacuum as set forth in claim 44, wherein the portable vacuum serves as a manual blower device after removal from the autonomous robotic vacuum when an accessory hose (115) is connected to a vacuum outlet (40) associated with the portable vacuum.

47. The autonomous robotic vacuum as set forth in claim 44, wherein the portable vacuum serves as a manual vacuum device after removal from the autonomous robotic vacuum when an accessory hose (115) is connected to a vacuum inlet (30) associated with the portable vacuum and an accessory power cord (213) is connected to a power connector (256) associated with the portable vacuum and a standard utility power receptacle.

48. The autonomous robotic vacuum as set forth in claim 44, wherein the vacuum source and dirt receptacle are associated with the portable vacuum and the portable vacuum serves as a manual blower device after removal from the autonomous robotic vacuum when an accessory hose (115) is connected to including a vacuum outlet (40) associated with the portable vacuum and an accessory power cord (213) is connected to a power connector (256) associated with the portable vacuum and a standard utility power receptacle.

49. The autonomous robotic vacuum as set forth in claim 42, further including:
a tensioning mechanism (108) supporting the interconnecting hose when the interconnecting hose is connected between the cleaning head and the controller.

50. The autonomous robotic vacuum as set forth in claim 42, the controller further including:
a power connector (256) for connecting an accessory power cord (213) between a standard utility power receptacle and the robotic vacuum to recharge the power source.

51. The autonomous robotic vacuum as set forth in claim 42, the cleaning head further including:
a power source (87) providing power to the cleaning head.

52. The autonomous robotic vacuum as set forth in claim 42, the cleaning head further including:
a hose sensor (94) in communication with the cleaning processor to detect an obstruction in the suction airflow path.

53. The autonomous robotic vacuum as set forth in claim 42, the cleaning head further including:
a floor loss sensor (96) in communication with the cleaning processor to detect a drop off in a portion of the surface area that would cause the cleaning head to hang up or fall.

54. The autonomous robotic vacuum as set forth in claim 42, the cleaning head further including:
a floor type sensor (97) in communication with the cleaning processor to detect whether a portion of the surface area is carpeted or non-carpeted.

55. The autonomous robotic vacuum as set forth in claim 42, the cleaning head further including:
a brush motor (100) controlling a brush (54) to assist in collection of dirt and dust particles through the suction inlet; and
a current sense circuit breaker (98) in communication with power distribution, the cleaning processor, and the brush motor to apply and remove power to the brush motor and, when power is applied, to detect an over current condition.

56. The autonomous robotic vacuum as set forth in claim 55, wherein the brush motor and brush are combined to a belt-less brush.

57. The autonomous robotic vacuum as set forth in claim 55, wherein the cleaning head further including:
a three-phase motor controller in communication with power distribution, the cleaning processor, and the brush motor, wherein the brush motor is a brush-less DC motor.

* * * * *